Oct. 18, 1960
K. FRÄNZ
2,957,136
PULSE COUNTING SYSTEM
Filed Sept. 12, 1957
3 Sheets-Sheet 1
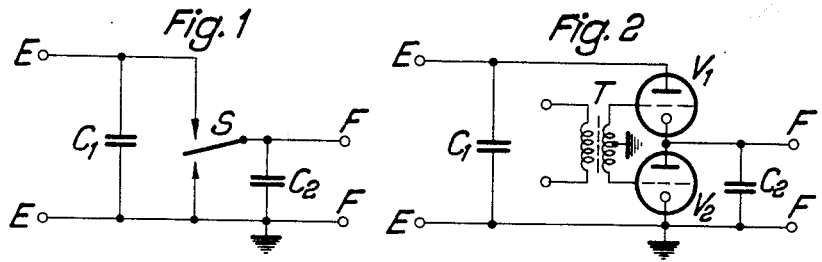
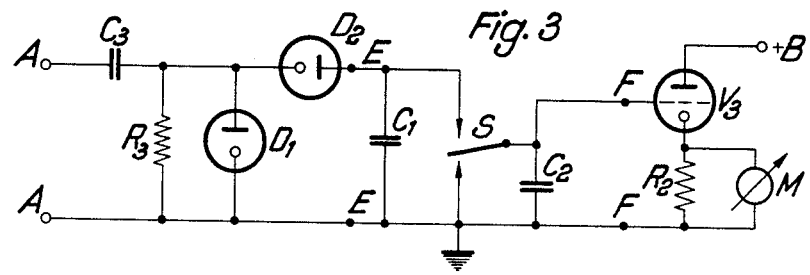
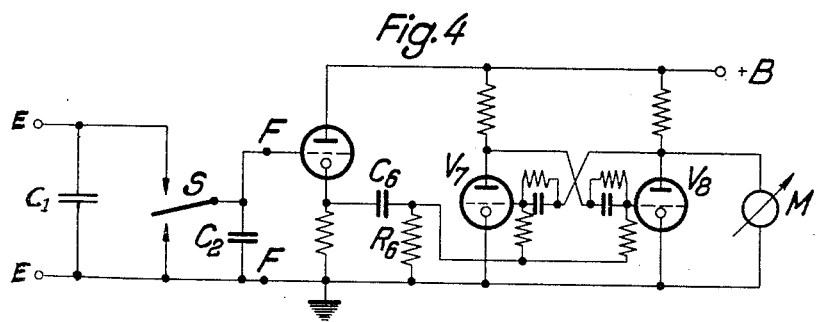
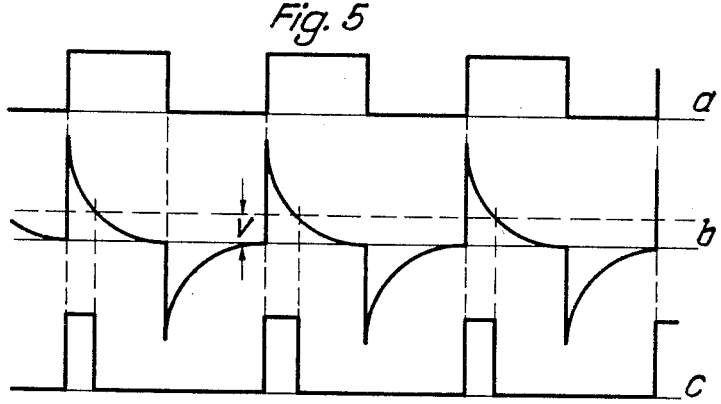
Inventor:
Kurt Fränz
By [signature]
Patent Agent Inventor:
Kurt Fränz United States Patent Office 2,957,136
Patented Oct. 18, 1960

2,957,136

PULSE COUNTING SYSTEM

Kurt Fränz, Ulm (Danube), Germany, assignor to Telefunken G.m.b.H., Berlin, Germany Filed Sept. 12, 1957, Ser. No. 683,587

15 Claims. (Cl. 324—78)

The present invention relates to a circuit arrangement for discharging of a condenser adapted to store electric energy. Such condensers are primarily used in circuits for integrating a train of signals, for example, for forming and indicating the mean value of a number of irregularly occurring pulses.

It is an object of the invention to provide a system for discharging a condenser by which extremely long discharge time constants, in the range of one hour, can be obtained and wherein the period of these time constants can be varied as desired in a simple manner, and wherein the discharge current represents an alternating current of, for example, rectangular form, so that the output current can be readily amplified.

It is another object of the invention to provide a system for counting pulses, wherein the charge of a condenser at every instant constitutes a measure as exact as possible of the mean value of the pulses fed to the input of the circuit.

It is a further object of the invention to connect a discharge condenser to the condenser to be discharged which, in the following, will be called storage condenser, via a periodically reversing switching means in such a manner that the discharge condenser is shunted across the storage condenser in one switch position and is itself subsequently short-circuited in the other switch position.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

Figure 1 shows a simple embodiment of a circuit diagram according to the invention, having a switch for discharging a storage condenser into a discharge condenser;

Figure 2 is another embodiment of a circuit diagram according to the invention, in which the switch of Figure 1 is replaced by a tube circuit;

Figure 3 is a circuit diagram illustrating the application of the system according to the invention to a pulse counter;

Figure 4 shows a circuit diagram of a measuring circuit having a logarithmic characteristic for use with a counter according to Figure 3;

Figure 5 is a diagram showing several curves illustrating the operation of the circuit according to Figure 4;

Figure 6:
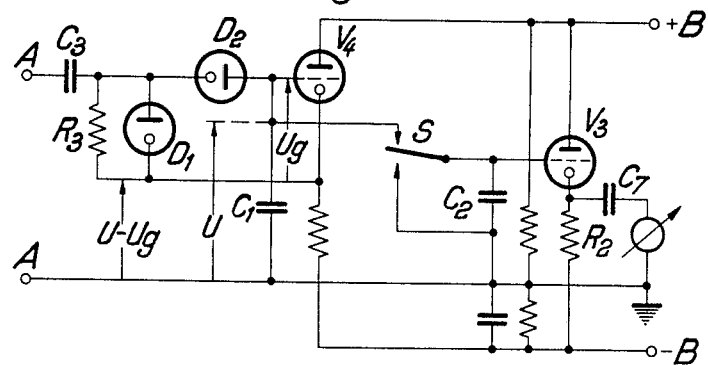
Figures 6, 7, 8 and 9 show the circuits of further embodiments according to the invention, which embodiments are improvements over the circuit according to Figure 3.

Referring now to Figure 1 of the drawings, C1 is a storage condenser to which the pulses to be counted are supplied via terminals E, E, whereby this condenser is charged according to the number of pulses. A discharge condenser C2 is provided for discharging the storage condenser C1, one plate of the discharge condenser C2 being permanently connected to one of the plates of the storage condenser C1, while the other plate of the discharge condenser C2 is connected to a periodically operated switch S adapted to alternatingly connect the latter plate to the second plate of the storage condenser C1. The operation of the switch S is such that, in the upper position of the switch S, the discharge condenser C2 is charged with current from the storage condenser C1 and, thereby receives a charge which, with respect to that of the storage condenser C1, has the ratio of the capacities C2/C1. The two plates of the discharge condenser C2 are short-circuited in the lower position of the switch S, so that the discharge condenser C2 is discharged. The discharge current flowing through discharge condenser C2 has a rectangular wave form if a mechanical switch S is used. The voltage of the storage condenser C1 decreases step by step, and decreases more quickly, the higher the switching rate of the switch S is made. If the capacity of the discharge condenser C2 is selected much smaller than that of the storage condenser C1, the steps involved in the lowering of the voltage across this storage condenser C1 become so small that the discharge of the voltage appears to be nearly smooth and continuous. The switch S may be a mechanical switch or chopper which, for example, is operated by an electromagnet fed from an alternating voltage source. It is possible to use a cathode ray switch or a tube circuit in place of the mechanical switch or chopper. By varying the switching frequency, the time constant of the discharge can be continuously controlled. The magnitude of the time constant is in this case inversely proportional to the switching rate. An extremely high time constant is obtained with the use of a slow switching frequency. An alternating voltage appears across the terminals F, F of the discharge condenser C2, said voltage being directly proportional to the charge of the storage condenser and inversely proportional to the switching frequency, whereby this alternating voltage can be utilized for measuring the number of pulses.

According to the example of Figure 2, the switching function is carried out by means of two triodes. The condensers used in this circuit correspond to those shown in Figure 1 and the same reference characters C1 and C2 have been used as in Figure 1. Two triodes V1 and V2 connected in series are provided to alternately connect one plate of the discharge condenser C2 to the second plate of the storage condenser C1, and to short-circuit the discharge condenser C2, whereby these triodes are controlled to alternately open and block by means of an alternating voltage applied to the grids of the triodes in push-pull. The voltage for controlling the two triodes V1 and V2 is fed to the primary of a transformer T, each of the output terminals of which are connected to one of these grids. A center tap of the secondary of the transformer T is grounded. As a result of this, the alternating voltages appearing at the grids of the two tubes V1 and V2 have opposite polarities with respect to ground. The wave form of the discharge current through the discharge condenser C2 corresponds to the wave form of the control voltage applied to the primary of the transformer T.

In place of the tube circuit described with reference to Figure 2, other circuit arrangements, for example, using diodes, transistors, thyratrons, etc., may be applied. Such circuits have been known per se and, therefore, are not described herein.

Figure 3 shows a pulse counting circuit, using a discharge means according to the invention for discharging of the storage condenser. The pulse counter may, for example, serve for measuring the radioactive disintegration of a substance. In this case, it is assumed that a Geiger-Mueller counter is used for feeding the pulse counter circuit, whereby the output pulses of the Geiger- Mueller counter are supplied to a tube circuit (not shown). The latter serves to amplify the pulses and then to give them a uniform wave shape, for example, by differentiation and amplitude clipping. The pulses thus clipped and shaped are supplied to the input terminals, AA of Figure 3. The input terminals AA are connected to a RC-high pass filter including a condenser C3 connected in series with the input and a shunt resistance R3. This RC-high pass filter causes a differentiation of the pulses supplied to eliminate deviations in the forms of the input pulses if such deviations are present, and to bring to zero the D.C. average value of the pulses supplied. A diode D1, shunted across the resistance R3, serves to short out the positive pulses of the differentiated wave form by discharging them to the ground. The negative pulses of the differentiated form are fed to a condenser C1 via a series diode D2. This diode D2 serves to prevent a discharge of the storage condenser C1 via the resistance R3. The condenser C1 represents, as in Figures 1 and 2, the storage condenser to which a charge is fed with each negative input pulse, so that an average charge is built up in the storage condenser C1 proportional to the number of pulses fed during a certain time interval. The total charge supplied to the condenser C1 equals the product of its capacity times the voltage of the differentiated pulses. Consequently, a fixed and constant charge is fed to the storage condenser C1 with each pulse. A discharge circuit according to the invention is provided to prevent a steadily growing charge on the storage condenser C1, so that its instantaneous charge represents a measure of the number of pulses received. In Figure 3, the embodiment according to Figure 1 is employed. It is possible to connect instead of the circuit according to Figure 1, the circuit according to Figure 2 between the terminals EE and FF. The circuit components in Figure 3 between the terminals EE and FF do not have to be explained again, since they are the same as those in Figures 1 or 2. A cathode follower amplifier V3 with a cathode resistance R2 is provided for measuring the alternating voltage across the discharge condenser C2. The terminals FF of the discharge circuit are connected between the grounded terminal of the cathode resistance R2 and the grid of the tube V3. The alternating voltage across the discharge condenser C2 and, thus, the number of the pulses received are measured in a measuring instrument M which is connected across the cathode resistance R2 of the cathode follower amplifier. The cathode follower in this system acts primarily as an impedance transformer matching the high impedance of the discharge condenser C2 to the lower impedance of the measuring instrument M.

As has been explained in the foregoing, the discharge time constant can be controlled within any desired limits by varying the switching rate. In this case, the measuring instrument M comprises a voltage meter, the indication of which is proportional to the switching rate, i.e., the frequency of the voltage amplified in the cathode follower amplifier. The use of such a measuring instrument has the advantage that the indication of the pulse frequency is independent of changes in the switching rate. If, for example, the switching rate is increased for the purpose of changing the time constant when a given train of pulses is being received, the voltage across the storage condenser C1 and the discharge current passing to the discharge condenser C2 are decreased, so that the output voltage across the measuring instrument M will also decrease. Since the deflection of the instrument M increases in proportion to the switching rate, the indication at the instrument M will be independent of the switching rate of the switch S.

The time constant may also be changed by changing the value of the storage condenser C1. An exchange of the storage condenser C1 leads to the difficulty that the pulse counter will furnish a proper indication only after this storage condenser has been charged to a steady-state value. In view of a possible requirement of a large time constant, up to one hour, such long waiting intervals are not permissible. Such waiting periods are avoided by continuously maintaining the alternate condensers connected to a source of potential equal to that of the storage condenser C1 which is presently in use. Such system will be described below with reference to Fig. 7.

The use of a discharge means according to the invention in a pulse counter circuit having an alternating form of discharge current which may be easily amplified to increase the indicating sensitivity makes it possible to provide a very simple conversion of a linear indication into a logarithmic indication if the discharge current has a rectangular form.

Such a circuit for converting a linear to a logarithmic indication is illustrated in Figure 4, the left part of which shows the discharge arrangement C1, S, C2, with the subsequent cathode follower amplifier V3, which components are the same as those in Figure 3. In place of the measuring instrument M of Figure 3, a series condenser C6 is connected to the cathode resistance R2 and a shunt resistance R6 is in turn connected to this series condenser C6. The latter two elements cause a differentiation of the rectangular voltage across the resistance R2, said rectangular voltage being indicated in curve *a* in Figure 5. The time constant of the differentiation elements C6R6 is selected in such a manner that the pulse voltage has practically decreased to zero when the leading edge of the next pulse is received, as indicated in curve *b* of Figure 5.

A bi-stable multivibrator circuit follows the differentiating elements, said multivibrator circuit being adapted to alternate from one stable operating condition to the other stable operating condition each time a positive peak of the differentiated pulses (see curve *b* of Figure 5) exceeds a certain voltage threshold V. The magnitude of V is determined by the characteristics of the tubes V7 and V8 comprising the multivibrator, the D.C. supply voltage applied, and the values of the remaining circuit components of the multivibrator. The multivibrator is triggered back into the first stable condition when the positive differentiated pulses, illustrated in curve *b* of Figure 5, have returned to a voltage value V. Rectangular pulses, as shown in curve *c* of Figure 5, are then obtained. Due to the exponential decrease of the differentiated pulses, the direct current average value of the rectangular pulses according to curve *c* of Figure 5 is proportional to the logarithm of the discharge current and, thereby, proportional to the logarithm of the number of pulses received during a certain time period. If the number of pulses supplied to the input terminals AA (Figure 3) during a time period is increased, the voltage in the storage condenser C1, the amplitude of the rectangular discharge current (see curve *a* of Figure 5) and, thereby the amplitude of the differentiated pulses (see *b* in Figure 5) will increase. As a result of the increase in amplitude of the differentiated train of pulses (see curve *b* of Figure 5), the time interval during which the voltage of the differentiated pulses exceeds the voltage threshold V increases logarithmically and, thereby, the pulses of the pulse train according to curve *c* of Figure 5 become longer. The pulse train according to curve *c* of Figure 5 is taken from the anode of the tube V8 of the multivibrator and is fed to a measuring instrument M indicating the direct current average value.

A cathode follower tube V3 is provided in the pulse counter circuit of Figure 3, whereby the alternating voltage of the discharge condenser C2, constituting a measure of the average value of the pulses, is supplied to the grid of this tube V3. Since in this system one end of the diode series circuit D1—D3, which is not connected to the storage condenser C1, leads to a point of fixed potential, the charge received from this storage condenser at each pulse varies with the charge already present therein. Consequently, the voltage across the storage condenser C1 is not exactly proportional to the average value of the pulses, as is desirable, i.e., actually the voltage increases slower at high pulse rates than would correspond to a strict proportionality.

According to a further development of the present invention, this difficulty is overcome by providing means for feeding the voltage present on the cathode of the cathode follower tube to that end of the diode series circuit which is not connected to the storage condenser C1. Since the voltage present on the cathode follower tube changes in the same direction as the voltage across the storage condenser C1, care has been taken that, regardless of the instantaneous charge condition encountered by the individual pulses, for pulses of the same amplitudes the same amounts of charge are transmitted to the storage condenser C1, and, thereby, the voltage across the latter will be proportional to the average value of the number of pulses.

In the circuit diagram of Figure 6, illustrating a further embodiment of the invention, the storage condenser is likewise denoted by C1. The pulses to be counted are fed to the terminals A, A with positive or negative polarity, whereby it is assumed that the pulses are already limited to constant amplitudes. The pulses are differentiated in a known manner by the RC elements comprising the condenser C3 and the resistance R3, which are the same components as in the circuit of Figure 3. As a result of this, a positive and a negative pulse is obtained from each input pulse, said positive and negative pulses being fed to the connecting point of the two diodes D1 and D2. The negative pulse is supplied to the storage condenser C1 via the diode D2, while the positive pulse is shorted out via the diode D1. A switch S, as in Figure 3, is provided to discharge the storage condenser C2, said switch being, for example, a telegraph relay or an electronic switch, etc. In the "up" switch position of the switch S, the discharge condenser C2 is charged to the voltage of the storage condenser C1, while this discharge condenser C2 is discharged in the "down" switch position. The capacity of the discharge condenser C2 is selected so small that the voltage across the storage condenser C1 decreases only slightly during charging of the discharge condenser C2, so that a large discharge time constant for the storage condenser C1 results. The rectangular voltage form occurring across the discharge condenser C2 is fed to the grid of the amplifier tube V3 in the cathode circuit of which the load resistance R2 is inserted. The voltage meter M is connected to the resistance R2 via a blocking condenser C7, whereby this meter indicates the output voltage of the amplifier V3 which substantially corresponds to the alternating voltage across the discharge condenser C2. It is noted that the cathode follower circuit comprising the amplifier tube V3 and the resistance R2 serves only for impedence transformation, so that the voltage across the discharge condenser C2 is not loaded down by the measuring instrument M.

The voltage U across the storage condenser C1 is fed to a further cathode follower tube V4 on the cathode of which a D.C. voltage is formed with respect to a reference potential, for example, ground, said voltage being smaller by the small amount of the voltage difference $U_g$ between the grid and cathode of the tube V4 than the voltage U across the storage condenser C1. The voltage $U$ minus $U_g$ is fed to the cathode of the diode D1, so that the voltage of the latter remains always the same as that of the storage condenser C1. The substantially constant difference $U_g$ is not disadvantageous, since it produces a biasing voltage for overcoming the range of the starting current of the diode at the diode combination. Thus, the charging pulses supplied to the storage condenser C1 have always the same magnitude independent of the condition of charge of the storage condenser C1.

Figure 7:
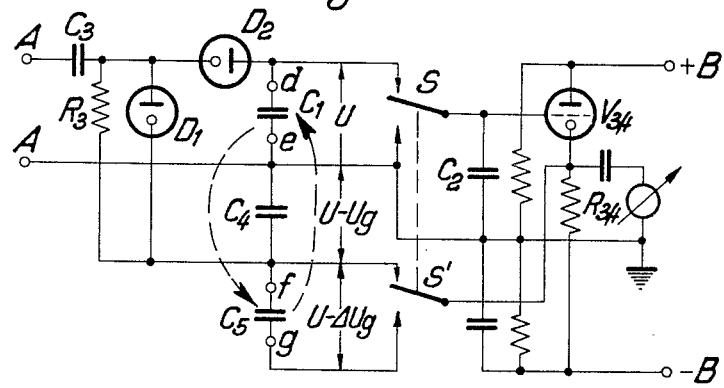

In the embodiment of Fig. 7, the functions of the cathode follower tubes V3 and V4 of Figure 6 are combined in a cathode follower tube V3, 4. In this case, a second switch S', simultaneously actuated with the switch S, is required to cause a simultaneous rectification of the voltage across a cathode resistance R3, 4 of the tube V3, 4. The same reference characters as in Figures 3 and 6 are used for like circuit components in Figure 7, so that it will not be necessary to describe them in connection with the latter. In the "up" switch position of the switch S, the voltage of the storage condenser C1 is applied to the discharge condenser C2, so that the voltage $U$ minus $U_g$ is present at the cathode of the tube V3, 4 with respect to ground. At the same time, the second switch S' is at the "up" switch position causing an auxiliary condenser C4 likewise to be charged to the voltage $U$ minus $U_g$, said condenser being inserted between ground and the cathode of the diode D1. This voltage $U$ minus $U_g$, thus, serves in the same manner as in the embodiment according to Figure 6, as a biasing voltage for the diode D1. The discharge condenser C2 is short-circuited in the "down" switch position of the switch S. Simultaneously, the switch S' is at the "down" switch position and the resistance R3, 4 is then separated from the condenser C4, so that the latter retains its charge.

According to a further development of the present invention, an alternate storage condenser C5 is provided which is inserted between the upper and lower terminals of the switch S'. This condenser C5 is always charged with the voltage $U$ minus $\Delta U_g$. In this case, U is the voltage which is measured simultaneously across the storage condenser C1 and $\Delta U_g$ is the amount by which the output voltage of the cathode follower tube V3, 4 is smaller than its input voltage. This additional condenser C5 may be exchanged for the storage condenser C1 to change the integration time constant of the pulse counter circuit, as indicated by dash-dash lines in Figure 7. The exchange may be facilitated by a two-pole change over switching device which has been omitted in the figure in order to avoid crowding thereof, whereby the switching device disconnects the storage condenser C1 from terminals $d$ and $e$ and the condenser C5 from terminals $f$ and $g$, and these two condensers are interchanged, so that the condenser C5 is inserted as storage condenser in the circuit. If the capacity ratio of the condensers C1 and C5 are suitably selected, the integration time constant of the pulse counter circuit will be varied as desired. The connection of a condenser which has been charged almost to the instantaneous voltage has the advantage over the insertion of an uncharged condenser that, after the changeover, no extended waiting time period, due to the large time constant, elapses until the counter circuit arrives at a steady state condition. The measuring test can be carried out immediately after the switch-over operation.

Figure 8:
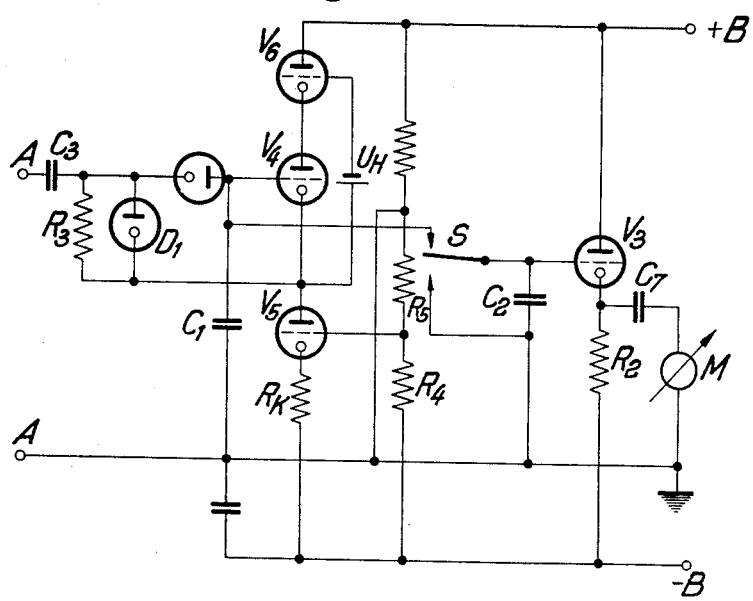

Figure 8 shows a further example of the invention as embodied in Figure 6, wherein it has been so designed that the voltage returned from the cathode resistance of the cathode follower stage V4 to the low side of the diode D1 exactly corresponds to the input voltage of the cathode follower. In case of a conventional cathode follower, there exists the relation $U_k = U_e - U_g$, between input voltage $U_e$ and output voltage $U_k$, wherein the voltage drop in the cathode-grid-circuit is denoted by $U_g$, as in the foregoing example. To actually obtain a voltage ratio of 1:1, care has to be taken that $U_g$ is independent of the anode current and of the anode voltage of the tube V4. This can be accomplished only if the change of the anode current $\Delta I_a$ and the change of the anode voltage $\Delta U_a$ is made zero. An auxiliary tube V5 with fixed grid voltage is placed in series with a resistance $R_k$ connected to the cathode of this auxiliary tube and provided as a cathode resistance for the cathode follower tube V4 to obtain the relation $\Delta I_a = 0$. A tube thus biased will only carry a constant current, so that the anode current of the tube V4 is kept constant. The grid biasing voltage of the auxiliary tube V5 is tapped from the voltage divider comprising the resistances R4 and R5.

A further auxiliary tube V6 is inserted in the anode circuit of the cathode follower tube V4 to fulfill the condition $\Delta Ua=0$, the grid of this auxiliary tube V6 being connected to the cathode of the cathode follower tube V4 via an auxiliary voltage source UH.

Figure 9:
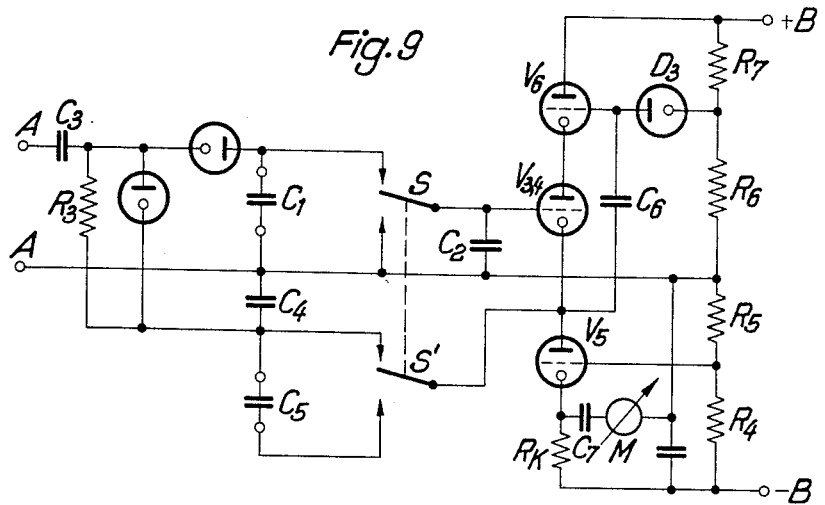

Figure 9 shows a further development of the invention embodied in Fig. 7, whereby for the same reasons as in Figure 8, the cathode follower tube V3, 4 is equipped with auxiliary tubes V5 and V6. In view of the fact that in Figure 9 an alternating current amplifier is provided, a circuit known per se is inserted in the grid circuit of the auxiliary tube V6 to re-introduce the D.C. component. This auxiliary tube V6 comprises a condenser C6 and a diode D3, the cathode of which is connected to a suitable point of the voltage divider R4, R5, R6, R7. Thus, the auxiliary voltage source UH, required for the D.C. amplifier in Figure 8, can be omitted.

I claim:

1. In a pulse counting circuit for indicating the mean value of a train of input pulses, said circuit having a storage condenser connected to the input of the circuit to receive and be charged by said input pulses to a value dependent upon the mean value of said input pulses, means for discharging said storage condenser at a time-metered rate comprising, a discharge condenser having one terminal connected to a plane of reference common to one terminal of said storage condenser; periodic switch means connecting the other terminal of the discharge condenser alternately to the other terminal of the storage condenser and then to said plane of reference thereby periodically short-circuiting said discharge condenser, the capacity of said discharge condenser being small in comparison with the capacity of said storage condenser, whereby the increments by which the former detracts from the charge on the latter are small enough to make the discharge appear to follow a substantially smooth characteristic; and a cathode follower amplifier connected across said discharge condenser and serving to provide an output signal electrically isolated from said discharge condenser wave form but substantially identical thereto.

2. In a pulse counter circuit as set forth in claim 1, a measuring instrument connected to the output of said cathode follower amplifier, the indication provided by said instrument being proportional to the rate of alternating of said periodic means.

3. In a pulse counter circuit as set forth in claim 1, said mean value of the train of pulses being represented by a rectangular wave form appearing across the discharge condenser; means for obtaining a logarithmic indication comprising a multivibrator; a differentiating network connected between said discharge condenser and said multivibrator, and furnishing synchronizing trigger voltages to the latter based on the said rectangular wave form, said multivibrator having a triggering threshold beyond which the output of the differentiating network will drive the multivibrator to the second of two stable conditions, the multivibrator returning to the first of said stable conditions only after the differentiated output has fallen below said threshold; and a measuring circuit connected to the multivibrator and indicating the mean value of the output of the multivibrator when in the second of said two conditions.

4. A pulse counting circuit comprising a differentiating circuit receiving a train of pulses to be counted; a storage condenser; two unidirectional conductors connected in series and at one end to said storage condenser, the output of the differentiating circuit being connected to the connecting point between said unidirectional conductors; a discharge condenser having one terminal connected to the other terminal of said storage condenser; periodic switch means connecting the opposite terminals of said condensers together and then alternately short-circuiting said discharge condenser; and a cathode follower amplifier actuated by the wave form across said storage condenser, said wave form being representative of the number of input pulses, and the output of said cathode follower being connected to the other end of said series-connected unidirectional conductors.

5. In a pulse counting circuit as set forth in claim 4, means for maintaining the cathode current of said cathode follower constant, comprising an auxiliary tube comprising the cathode impedance of the cathode follower, said auxiliary tube having a fixed grid bias; and means for maintaining the anode voltage of the cathode follower constant, comprising a second auxiliary tube inserted in the anode circuit of the cathode follower, the grid of the second auxiliary tube being connected to the cathode of the cathode follower.

6. In a pulse counting circuit as set forth in claim 5, the grid of the second auxiliary tube being connected to receive a signal from the cathode of the cathode follower and to be maintained at an operating point differing from that of said cathode by a fixed potential.

7. A pulse counting circuit comprising a differentiating circuit receiving a train of pulses to be counted; a storage condenser; two unidirectional conductors connected in series and at one end to said storage condenser, the output of the differentiating circuit being connected to the connecting point between said unidirectional conductors; a discharge condenser having one terminal connected to the other terminal of said storage condenser; first periodic switch means connecting the opposite terminals of said condensers together and then alternately short-circuiting said discharge condenser; a cathode follower amplifier actuated by the wave form across said discharge condenser, and an auxiliary capacitor connected at a junction to the other end of said series-connected unidirectional conductors and said auxiliary capacitor being connected at its other end to the other terminal of said storage condenser; and a coupling means connecting the output of said cathode follower with said junction.

8. In a pulse counting circuit as set forth in claim 7, at least one alternate storage condenser of different capacity than said first-mentioned storage condenser; a substituting means for exchanging said storage condenser; and said coupling means comprising a second periodic switch means actuated simultaneously with said first switch means and connected to supply the output voltage of the cathode follower to said junction when the discharge condenser is connected across the storage condenser, and to supply the output voltage of the cathode follower to charge the alternate storage condenser when the discharge condenser is being short-circuited.

9. In a pulse counting circuit as set forth in claim 8, means for maintaining the cathode current of said cathode follower constant, comprising an auxiliary tube comprising the cathode impedance of the cathode follower, said auxiliary tube having a fixed grid bias; and means for maintaining the anode voltage of the cathode follower constant, comprising a second auxiliary tube inserted in the anode circuit of the cathode follower, the grid of the second auxiliary tube being connected to the cathode of the cathode follower.

10. In a pulse counting circuit as set forth in claim 9, the grid of the second auxiliary tube being connected to receive a signal from the cathode of the cathode follower and to be maintained at an operating point differing from that of said cathode by a fixed potential.

11. In a pulse counting circuit as set forth in claim 9, the grid of the second auxiliary tube being connected to the cathode of the cathode follower by a condenser; and a diode having its plate connected to the grid of the second auxiliary tube and its cathode connected to a source of fixed potential.

12. A pulse counting circuit comprising, an input terminal for receiving a train of pulses to be counted; a storage condenser; two uni-directional conductors connected in series at one end to said storage condenser, said input terminal being connected to the connecting point between said uni-directional conductors; a discharge condenser having one terminal connected to the other terminal of said storage condenser; periodic switch means connecting the opposite terminals of said condensers together and then alternately short-circuiting said discharge condenser; and a cathode follower amplifier actuated by the wave form across said storage condenser, said wave form being representative of the number of input pulses, and the output of said cathode follower being connected to the other end of said series-connected uni-directional conductors.

13. In a pulse counting circuit as set forth in claim 12, means for maintaining the cathode current of said cathode follower constant, comprising an auxiliary tube comprising the cathode impedence of the cathode follower, said auxiliary tube having a fixed grid bias; and means for maintaining the anode voltage of the cathode follower constant, comprising a second auxiliary tube inserted in the anode circuit of the cathode follower, the grid of the second auxiliary tube being connected to the cathode of the cathode follower.

14. In a pulse counting circuit as set forth in claim 13, the grid of the second auxiliary tube being connected to receive a signal from the cathode of the cathode follower and to be maintained at an operating point differing from that of said cathode by a fixed potential.

15. A pulse counting circuit comprising, an input terminal for receiving a train of pulses to be counted; a storage condenser; two uni-directional conductors connected in series at one end to said storage condenser, said input terminal being connected to the connecting point between said uni-directional conductors; a discharge condenser having one terminal connected to the other terminal of said storage condenser; first periodic switch means connecting the opposite terminals of said condensers together and then alternately short-circuiting said discharge condenser; a cathode follower amplifier actuated by the wave form across said discharge condenser, and an auxiliary capacitor connected at a junction to the other end of said series-connected unidirectional conductors and said auxiliary capacitor being connected at its other end to the other terminal of said storage condenser; and a coupling means connecting the output of said cathode follower with said junction.

References Cited in the file of this patent

UNITED STATES PATENTS

| | | |
|---|---|---|
| 2,457,676 | Holmes | Dec. 28, 1948 |
| 2,555,491 | Hooven | June 5, 1951 |
| 2,573,150 | Lacy | Oct. 30, 1951 |
| 2,584,990 | Dimond | Feb. 12, 1952 |
| 2,759,138 | Andrews | Aug. 14, 1956 |
| 2,767,582 | Bartelink | Oct. 23, 1956 |
| 2,796,533 | Morton et al. | June 18, 1957 |
| 2,851,599 | Henry | Sept. 9, 1958 |

FOREIGN PATENTS

| | | |
|---|---|---|
| 1,057,582 | France | Oct. 28, 1953 |
| 1,059,255 | France | Nov. 10, 1953 |

OTHER REFERENCES

"Staircase Generator Counts Pulses," article in Electronics, March 1954, pp. 187–189.